C. H. Robinson,

Hay Press,

No. 2,105, Reissued Nov. 14, 1865.

Witnesses:
Henry Clem
C. L. Topliff.

Inventor:
C. H. Robinson
per Munn & Co
Attorneys.

AM. PHOTO-LITHO. CO. N.Y. (OSBORNE'S PROCESS)

UNITED STATES PATENT OFFICE.

CHARLES H. ROBINSON, OF BATH, MAINE.

IMPROVED BALING-PRESS.

Specification forming part of Letters Patent No. 45,863, dated January 10, 1865; Reissue No. 2,105, dated November 14, 1865.

*To all whom it may concern:*

Be it known that I, CHARLES H. ROBINSON, of the city of Bath, county of Sagadahoc, and State of Maine, have invented certain new and useful Improvements in Presses for Pressing Cotton, Hay, and other Substances; and I do hereby declare that the following description and accompanying drawings are sufficient to enable any person skilled in the art or science to which it most nearly appertains to make and use my said invention or improvements without further invention or experiment.

The nature of my invention and improvements in toggle-lever presses consists in fixing the first of the three pivots of the toggle-levers or links at, to, or near the platen, the second pivot to the follower, and moving the second pivot toward the first, and vibrating the third pivot so as to bring the toggle links or levers nearly or quite parallel in pressing the bale, and in operating the follower of the press at the beginning of the pressing operation, and while the cotton or hay is comparatively but little compressed, by the direct action of a rope and pulleys, in combination with the subsequent working or operating of the follower, by the toggle links or arms, to complete the pressing of the bale or bundle compressed; also, in working the toggle links or levers by a rope or chain arranged to run around pulleys at or in the opposite ends of the levers or links which carry the follower.

Figure 1:
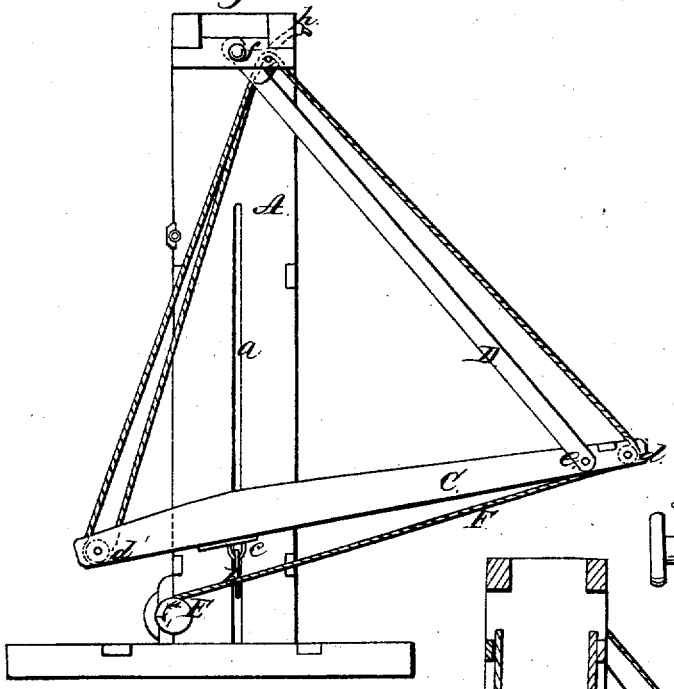
Figure 3:
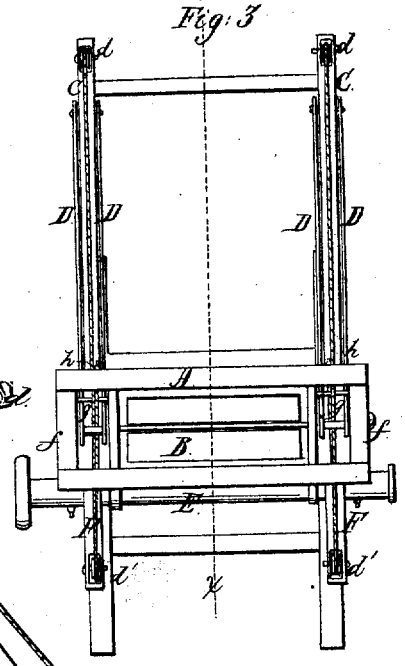
Figure 2:
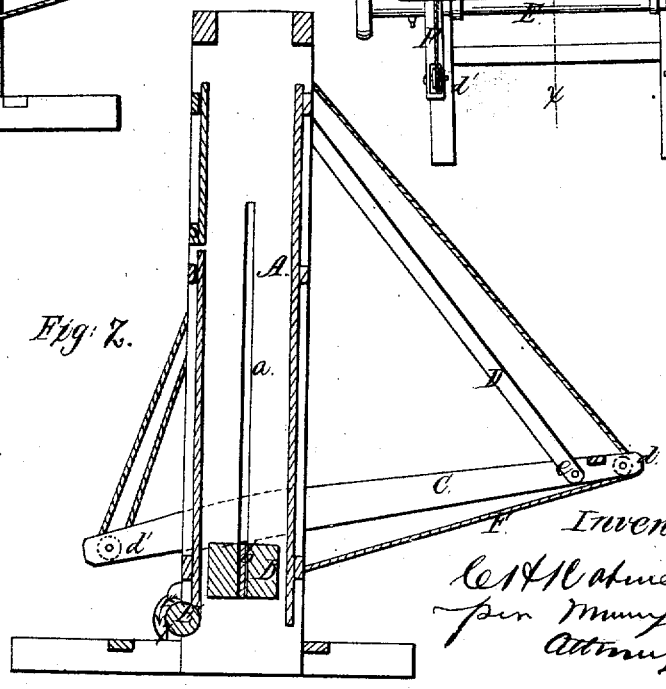

In the above-mentioned drawings, Figure 1 is an elevation of a press with my improvements. Fig. 2 is a sectional elevation on the line *x x* of Fig. 3. Fig. 3 is a plan or top view of the press.

In these drawings, A is the press-box, supported by the sills A′, which are connected by the bars *b b*. The ends or narrow sides of the box A have a perpendicular slot or opening, *a*, through them, in which the ends or metal plates *b′ b′* of the follower B traverse when the press is operated. The narrow sides A of the press-box are connected by the bars *k k*, which support the planking *l*, and by the top bars, N N, which are connected at the ends by the bars P, fastened under the ends of the bars N, as shown in the drawings. The upper ends of the toggle-links D D are hung on the pins *f*, which pass through the bars P and narrow sides, A, of the box. The opposite ends of the links D D are connected by the pins *e* to the toggle levers or links C C, which traverse with the follower B, being connected to the plates *b′* by the staple *c*, as shown in Fig. 1. The outer ends of the lever-links C C are connected by the bar *e′*. The lever-links C are provided with pulleys *d d′*, one at each end, as shown by dotted lines in Fig. 1. To work the link-levers C, the ends of two ropes, F, are fastened at *h* in the bar N, and pass down around the pulleys *d′* and up over the pulley or pin *g* in the bar P and side A; then down around the pulley *d* to the windlass E, which turns in boxes on the sides, A, of the box. *m*, Fig. 2, is a door swinging on pivots *n*, Fig. 1, which door may be provided with some convenient fastenings. There are two links, D, to each lever-link C, so arranged that the lever-links C swing right in between the links D when the bale is pressed, so that the lever-links and the links D are parallel.

This press may be operated in the following manner—that is, the follower may be dropped to the bottom of the press-box and the door *m* opened and the box filled with hay up to the door, which may then be closed and fastened, and the upper part of the press-box filled through the opening in the top between the bars N N, and the platen inserted over it (the hay) under the bars N. The windlass E may now be turned to wind up the rope F, which draws up the lever-links and follower by the direct action of the rope and pulleys until the follower gets some distance above the pivot *e* of the links and the lever-links C C begin to push up the follower, which they continue to do as the rope draws the pulley *d* down and the pulley *d′* up, until the link-levers C pass in between the links D D and stand parallel with each other or one another, when the pulley *d* may be drawn to the windlass E and the pressing completed, when the door *m* may be opened and the bale bound and removed.

I contemplate that by arranging the pulley *d′* between the follower and the pin *e* there may be two sets of links and levers used at each end of the press; and, further, that the links and levers may be arranged to work in a position at a right angle to that in which they are shown in the drawings and parallel with the follower at the ends or narrow sides of the press; also, that they may be arranged to work the follower down in pressing instead of up.

What I claim as my invention and improvements in toggle-lever presses is—

1. Fixing the first of the three pivots of the toggle levers or links at, to, or near the platen, the second pivot to the follower, and moving the second pivot toward the first, and vibrating the third pivot so as to bring the toggle links or levers nearly or quite parallel in pressing the bale.

2. Working or operating the follower of the press at the beginning of the pressing operation, and while the cotton or hay is comparatively but little compressed, by the direct action of the rope and pulleys, in combination with the subsequent working or operating of the follower, by the toggle links or levers, to complete the pressing of the bale or bundle.

3. Working the toggle links or levers by a rope or chain arranged to run around pulleys at or in the opposite ends of the levers or links which carry the follower.

CHAS. H. ROBINSON.

Witnesses:

L. DEDERICK,

P. K. DEDERICK.